United States Patent
Murakami et al.

(10) Patent No.: US 7,512,260 B2
(45) Date of Patent: Mar. 31, 2009

(54) SUBSTRATE INSPECTION METHOD AND APPARATUS

(75) Inventors: Kiyoshi Murakami, Kyoto (JP);
Yasunori Asano, Ayabe (JP); Takashi Kinoshita, Kyoto (JP); Teruhisa Yotsuya, Kyoto (JP)

(73) Assignee: OMRON Corporation, Kyoto (JP)

( * ) Notice: Subject to any disclaimer, the term of this patent is extended or adjusted under 35 U.S.C. 154(b) by 548 days.

(21) Appl. No.: 11/218,920

(22) Filed: Sep. 2, 2005

(65) Prior Publication Data
US 2006/0050267 A1 Mar. 9, 2006

(30) Foreign Application Priority Data
Sep. 6, 2004 (JP) ............................. 2004-258488
Sep. 2, 2005 (JP) ............................. 2005-255009

(51) Int. Cl.
G06K 9/00 (2006.01)
G01R 31/26 (2006.01)

(52) U.S. Cl. ........................................ 382/145; 438/14

(58) Field of Classification Search ......... 382/145–151, 382/276, 284; 438/14–18
See application file for complete search history.

(56) References Cited

U.S. PATENT DOCUMENTS

| | | | | |
|---|---|---|---|---|
| 5,010,504 A * | 4/1991 | Lee et al. | ..................... | 382/275 |
| 5,185,811 A * | 2/1993 | Beers et al. | ................. | 382/151 |
| 5,187,754 A * | 2/1993 | Currin et al. | ................ | 382/284 |
| 5,325,449 A * | 6/1994 | Burt et al. | .................... | 382/240 |
| 5,371,690 A * | 12/1994 | Engel et al. | ................. | 382/151 |
| 5,488,674 A * | 1/1996 | Burt et al. | .................... | 382/284 |
| 5,694,481 A * | 12/1997 | Lam et al. | .................... | 382/145 |
| 5,764,536 A * | 6/1998 | Yamamoto et al. | ............ | 701/81 |
| 5,768,443 A * | 6/1998 | Michael et al. | ............. | 382/294 |
| 6,075,905 A * | 6/2000 | Herman et al. | ............. | 382/284 |
| 6,307,210 B1 * | 10/2001 | Suzuki et al. | .......... | 250/559.08 |
| 6,549,222 B1 * | 4/2003 | Skoll | .......................... | 715/856 |
| 7,085,411 B2 * | 8/2006 | Beaty et al. | ................. | 382/154 |
| 7,149,343 B2 * | 12/2006 | Enachescu et al. | .......... | 382/149 |
| 2006/0280358 A1 * | 12/2006 | Ishikawa | .................... | 382/149 |

FOREIGN PATENT DOCUMENTS

JP 06-258244 9/1994

(Continued)

OTHER PUBLICATIONS

Japan patent application No. 2005-255009, Examination Report dated Oct. 24, 2006.

*Primary Examiner*—Matthew C Bella
*Assistant Examiner*—Manav Seth
(74) *Attorney, Agent, or Firm*—Weaver Austin Villeneuve & Sampson LLP

(57) ABSTRACT

Preparation steps are taken before a substrate with components is inspected and a whole image of a standard substrate is prepared preliminarily and inspection areas are determined for target portions to be inspected on this whole image. At the time of the inspection, a camera is positioned corresponding to a target portion to obtain a target image and an area corresponding to the target image is extracted from the whole image and displacement values of this area are calculated relative to the target image. The setting position of the inspection area is corrected by the calculated displacement values and an inspection area is set on the target image based on the corrected coordinates.

6 Claims, 11 Drawing Sheets

FOREIGN PATENT DOCUMENTS

| | | |
|---|---|---|
| JP | 09-015302 | 1/1997 |
| JP | 09-184711 | 7/1997 |
| JP | 09-211080 | 8/1997 |
| JP | 2002-181729 | 6/2002 |
| JP | 2003-222598 | 8/2003 |

* cited by examiner

US 7,512,260 B2

SUBSTRATE INSPECTION METHOD AND APPARATUS

This application is based on and claims priority from Japanese Patent Applications 2004-258488 filed Sep. 6, 2004 and 2005-255009 filed Sep. 2, 2005.

BACKGROUND OF THE INVENTION

This invention relates to a method of and an apparatus for using an image taken of a component mounting substrate (herein referred to simply as a substrate) to inspect the presence or absence of components, their positional displacements and appropriateness of soldering.

As disclosed in Japanese Patent Publication 2003-222598, the present assignee of this invention has developed a substrate inspection apparatus for automatically inspecting mounted conditions and soldering conditions of components. This inspection apparatus is provided with a substrate stage for supporting a target substrate which is the object of inspection, a camera for taking an image of the substrate and a table part (including both an X-axis part and a Y-axis part) for moving the substrate stage and the camera on a horizontal plane. At the time of an inspection, each table part is controlled so as to match the field of vision of the camera with a specified area on the substrate. An image obtained under this condition is processed in order to make measurements that are necessary for the inspection of target portions to be inspected inside this specified area and measured values thus obtained are compared with specified standard values.

With an inspection apparatus of this kind, a process referred to as the teaching process is usually carried out prior to the inspection wherein inspection data of various kinds are prepared and registered in a memory. The so-called setting data of inspection areas that are set at each target inspection portion are included in the inspection data. At the time of an inspection, inspection areas are set on the image of the target substrate to be inspected (hereinafter referred to as the target image) based on the aforementioned setting data and the inspection of each target inspection portion is carried out by processing the image of each inspection area.

In order to carry out an inspection process as described above, it is necessary to adjust the position of the substrate or the camera such that the target inspection portion on the substrate will be placed according to the setting data of the inspection area. According to a general prior art method, positioning marks are attached to appropriate positions on the substrate, these marks are extracted from the image of the substrate after it is transported into the image-taking position, and the X-axis and the Y-axis parts are controlled such that these extracted positions will match preliminarily specified reference positions.

Japanese Patent Publication Tokkai 9-15302 discloses a technology similar to the one described above, according to which two positioning patterns are extracted from an image of the substrate, the position of the substrate stage is adjusted such that the middle point of the line segment connecting these two extracted positions will match the middle point of the line segment connecting reference positions of these patterns and the substrate stage is further rotated by the angle between these two line segments.

By such a method of controlling the driving mechanism for the substrate stage, however, it is not possible to overcome the effects of errors due to the characteristics of the driving mechanism. Since very small components are coming to be mounted to substrates and at a very high density in recent years, the error in the positioning of the substrate may be small but an error may be generated in the setting of inspection area and incorrect inspection results may be obtained. In order to reduce the error, a highly accurate driving mechanism will be required and this affects the cost adversely.

SUMMARY OF THE INVENTION

It is therefore an object of this invention in view of the problem stated above to eliminate the effects of errors in the motion of the positioning stage for the substrate and the camera by adopting a software method of adjusting the setting position of the inspection area with respect to the target image such that the inspection area can be accurately set with respect to a target portion of inspection and the accuracy of inspection can be improved.

The invention therefore relates firstly to a method of inspecting a plurality of target portions on a substrate having components mounted thereon by using an image taken of this substrate by image taking means and this method is characterized as comprising preparation steps and inspection steps.

The preparation steps are what correspond to so-called teaching steps and include Steps A, B, C and D that are characterized as follows.

In Step A, a standard image, which is defined as an image that becomes obtainable when the field of vision of this image taking means matches a specified area on the substrate, is obtained. This standard image may be obtained by dividing a standard substrate with a high quality into a plurality of areas to be photographed and joining together the images thus obtained for the individual areas to obtain a whole image of this standard substrate. Alternatively, the image taking means may be position-matched at a specified position of the standard substrate to photograph it to obtain such an image. If the substrate is small enough such that its whole can be put within the field of vision of the image taking means, the whole image of this substrate may be set as the standard image.

In Step B, a positional relationship between the image taking means and the substrate that is necessary for position-matching the image taking means to the aforementioned specified area is obtained. This positional relationship may be expressed as position data of the area (hereinafter referred to as the target area) on the substrate corresponding to the field of vision of the image taking means. Such position data may be expressed also as the relative coordinates of a specified position within this target area as seen from a specified reference point on the substrate. In such a situation, if a whole image of the substrate is created, the relative coordinates with respect to the reference point on the whole image may be obtained. Since the size of the target area is determined by the field of vision of the image taking means, coordinates of any specified single point within the target area may be obtained but this is not necessary. The position and the size of the target area may be expressed, for example, by obtaining the relative coordinates of the top left-hand and bottom right-hand corners of the target area. This positional relationship may be expressed also as the coordinates of a table part for adjusting these positions.

In Step C, an inspection area is set at a target portion on the standard image. This setting step is preferably carried out by using design data (such as CAD data) of the substrate. In such a case, for example, the positional relationship obtained in Step B may be used to extract, from the design data of the substrate, data inside the area corresponding to the standard image and the position and the size of an inspection area suitable to a target portion to be inspected shown by the extracted data. Each inspection area may be set by displaying the standard image on a monitor to allow the user to carry out a setting operation.

In Step D, the positional relationship of the standard image obtained in Step A, the positional relationship obtained in Step B between the image taking means and the substrate and the positional relationship set in Step C between the inspection area and the standard image are correlated and registered.

Regarding the inspection area set in Step C, it is preferable to register data indicative of the size of the inspection area in addition to the positional relationship with the standard image. Not only the relative coordinates of a specified point of the inspection area with respect to a specified point on the standard image are expressed as the position of the inspection area, the width of each side of the inspection area may be expressed as its size. Relative coordinates of the top left-hand corner and the bottom right-hand corner of the inspection area may be obtained with respect to a specified point on the standard image and the position and the size of the inspection area may be expressed by these coordinates.

The inspection steps include the following first, second, third and fourth steps.

In the first step, a target image for inspection is created by position-matching the image taking means to a target substrate for inspection based on the positional relationship registered in Step D between the image taking means and the substrate. The position-matching of the image taking means may be effected by moving a stage part of at least either one of the image taking means and the substrate with respect to the other but if there is an error in the amount of the movement, an image of the same area as the standard image cannot be obtained and there is a possibility of positional displacement of the target image with respect to the standard image.

In the second step, displacement values of the target image with respect to the standard image are detected by matching the target image created in the first step with the standard image registered in Step D. This step may be carried out preferably by scanning the target image of the standard image with respect to the other, carrying out a matching process at each specified interval (preferably for each pixel) by a correlation calculation or a grading differentiation calculation and detecting the displacement when the degree of similarity between the two images becomes a maximum. Although there is a possibility that the image of the target substrate may contain defective portions, the remaining portions are close to the standard image. Thus, the degree of similarity may be considered to assume a maximum value when the standard image and the target image are in a matching positional relationship and displacement values can be detected accurately.

In the third step, the positional relationship registered in Step D between the inspection area and the standard image is corrected by the displacement values detected in the second step and an inspection area is set on the target image based on the corrected positional relationship. For example, the coordinates indicative of the position of the inspection area with respect to the standard image may be changed by the displacement values to set the inspection area at the position of the coordinates after they were moved.

In the fourth step, image data in the inspection area set in the third step are used to carry out an image processing for the inspection steps. This image processing may be carried out according to the prior art technology, say, as disclosed in aforementioned Japanese Patent Publication 2003-222598, or various inspection data for this fourth step, such as the kinds of programs to be carried out, parameters such as threshold values for binarization, reference values for measured data and threshold values for judgment processes, may be registered for each inspection area in the preparation steps.

By such a substrate inspection method, it is possible to extract by a software processing displacement values of a camera from its proper position and the setting position of an inspection area can be corrected by using such extracted data. Since an inspection area can thus be set accurately independent of the characteristics of the stage part, the image processing process necessary for the inspection can be properly carried out in the fourth step.

Next, two (first and second) examples of the method of this invention are explained.

According to the first example, Step A is characterized as including Steps A1, A2, A3 and A4 and Step C is characterized as including Steps C1 and C2 where Step A1 is for dividing a standard substrate of a good quality into a plurality of target areas with a size according to the field of vision of the image taking means and carrying out an image taking process for each of these areas, Step A2 is for creating a whole image of the standard substrate by joining the images created for the individual areas in Step A1, Step A3 is for setting on this whole image an area that includes a specified number of target portions to be inspected and has a size according to the field of vision of the image taking means, Step A4 is for setting an image inside an area set in Step A3 as the standard image, Step C1 is for extracting substrate design data in an area corresponding to the standard image set in Step A4 from substrate design data corresponding to the standard substrate, and Step C2 is for determining setting conditions for an inspection area corresponding to said standard image by using said extracted substrate design data.

In the first example, Step A1 is preferably carried out by setting the target areas such that they overlap by a width corresponding to the error that takes place when the aforementioned stage part is being operated. In such a case, Step S2 is preferably carried out by creating the whole image by sequentially overlapping their overlapping portions. A more appropriate whole image can be created if a pattern matching is carried out at the time of this overlapping process by using image data of these overlapping portions and the correspondence relationship among the images is adjusted based on the results of this matching process.

In Step C1, the substrate design data of the area corresponding to the standard image can be extracted based on the positional relationship of the standard image with respect to the whole image after the coordinate systems of the whole image created in Step A and the substrate design data are matched based on a specified reference point on the substrate (such as the center point of a positioning mark on the substrate). In Step C2, a target portion to be inspected can be extracted from the extracted substrate design data and an inspection area suitable to this target portion may be set such that the position and the size of this area can be used as setting conditions of the inspection area. In this case, it is preferable to express the position of the inspection area in terms of relative coordinates with respect to a specified point on the standard image. Since an image corresponding to the standard image is obtained at an actual inspection, these relative coordinates can be directly applied to this image and an inspection area can be set in a simple manner.

In Step D in the case of the first example, only the standard image set in Step A4 may be cut out from the whole image of the standard substrate and registered but the whole image may be registered instead.

In the case of the first example, Step A3 may include setting on the whole image of the standard substrate areas corresponding to the areas used in the image taking processing in Step A1 and Step A4 may include setting images of individual ones of these areas set in Step A3 as individual standard images. In this way, an image taking process can be carried out for the inspection also under the same conditions as at the time of creating the whole image such that the target substrate can be inspected as a whole. When this method is used, the standard images obtained for the individual areas may be registered as synthesized into a whole image.

In the case of the first example, Step A3 may include determining setting condition of an inspection area corresponding to a specified target portion on the substrate based on substrate design data corresponding to the standard substrate and setting an area including an inspection area by this setting condition. In this case, it becomes possible to take images under conditions different from when the whole image is created. Thus, even if there is a target portion for inspection that spans over target areas when the whole image is created, an inspection becomes possible by creating an image including the whole of this target portion and hence the degree of freedom in inspection improves. Efficiency of inspection can be further improved if a map image showing the distribution of inspection areas over the entire substrate is created from the substrate design data and a process of assigning target areas is carried out.

According to the second example, Step A is characterized as including Steps A1 and A2 and Step C is characterized as including Steps C1, C2 and C3 where Step A1 is for determining setting conditions for an inspection area for a specified target portion on the substrate based on design data of this substrate, Step A2 is for obtaining an image of a standard substrate of a good quality by position-matching the image taking means such that the field of vision of the image taking means includes the inspection area according to the setting condition determined in Step A1 and carrying out an image taking process and using the obtained image as the standard image, Step C1 is for detecting a target portion on the standard image, Step C2 is for detecting displacement values of the target portion with respect to the target area when the target area is set based on the setting condition determined in Step A1, and Step C3 is for correcting setting position of the inspection area based on the displacement values detected in Step C2.

In Step A, the standard image can be obtained without creating any whole image but by using substrate design data to determine a target area at an arbitrary position on the substrate and position-matching the image taking means to this target area on the standard substrate. If this method is used, the field of vision of the image taking means may be displaced from the target area and a correct standard image may not be obtained but this problem can be coped with by the processes of Steps C1 and C2.

In Step C1, a target portion to be inspected can be extracted from the standard image by a process such as binarization and edge extraction according to its characteristics. A target portion may be extracted from substrate design data or by displaying the standard image on the monitor and specifying a target portion on the display screen.

In Step C2, displacement values at the time when positional relationship becomes suitable or creating the standard image (or when extracted target portions on the standard image each become contained in a inspection area) can be detected by creating a map image for showing the distribution of inspection area based on the setting condition determined in Step A1 and scanning this image with respect to the standard image.

Efficiency and the degree of freedom of inspection can be improved also by the second example because it is made possible to carry out the inspection by setting a target area at any position on the substrate.

The invention relates secondly to an apparatus for inspecting a plurality of target portions on a substrate having components mounted thereon by using an image taken of the substrate, comprising a substrate stage for supporting a target substrate to be inspected with the target portions facing upward, an image taking means for photographing a substrate supported by this substrate stage from above, moving means for changing relative horizontal position between the image taking means and the substrate stage, a memory that registers a standard image obtained when the field of vision of the image taking means is matched to a specified area on the target substrate, positional relationship between the image taking means and the substrate when the standard image is obtained and positional relationship of inspection area with respect to the standard image, position adjusting means for controlling motion of the moving means such that the positional relationship between the image taking means and the substrate is adjusted to be the same as the positional relationship registered in the memory, image creating means for creating a target image to be processed by operating the image taking means after adjustment is made by the position adjusting means, displacement detecting means for detecting displacement values of the target image with respect to the standard image by matching the target image with the standard image, area setting means for correcting the positional relationship between the inspection area and the standard image registered in the memory by the displacement values detected by the displacement detecting means and setting an inspection area on the target image based on the corrected positional relationship, and image processing means for carrying out image processing for inspection by using image data in the inspection area set by the area setting means.

In the above, the moving means corresponds to the aforementioned table control parts and may be provided both to the substrate stage and to the image taking means. In such a case, the table control part for the image taking means may be adapted to move in one horizontal direction and that for the substrate stage in another horizontal direction perpendicular to it. A table control part may be provided to only one of them and adapted to move in one of these two horizontal directions. A rotary mechanism may further be provided to this table control parts.

The memory may be used to register the standard image created in the preparation steps. It is preferable that a non-volatile memory be used.

The position adjusting means, the image creating means, the displacement detecting means, the area setting means and the image processing means may each be formed as a computer having a program installed therein. The aforementioned first, second, third and fourth steps of the method of this invention may be considered to be carried out by the program installed respectively in the position adjusting and image creating means, the displacement detecting means, the area setting means and the image processing means.

These program each corresponding to one of these means may be all installed in one computer. The aforementioned memory may be provided in such computer or externally to such a computer. The apparatus of this invention may be further provided with means for creating data to be registered to the memory, as will be shown below. On the other hand, the memory may be adapted to register a whole image or setting data of an inspection area created by another computer.

Apparatus of this invention for carrying out the aforementioned first example of the method of this invention may be characterized as further comprising image taking control means for controlling the moving means and the image taking means such that, when a standard substrate with a good quality is supported on the substrate stage, the standard substrate is photographed by being divided into a plurality of areas with a size corresponding to the field of vision of the image taking means, image synthesizing means for synthesizing images obtained by a control by the image taking control means to obtain a whole image of the standard substrate, standard image extracting means for setting on the whole image an area including a specified number of target portions to be inspected and having a size corresponding to the field of vision of the image taking means and extracting an image in the area as the standard image, condition determining means for determining setting conditions of inspection areas for the standard image based on substrate design data inside the area where the standard image is extracted, and registering means for registering the standard image in the memory, extracting positional relationship between the inspection area based on the setting condition determined by the condition determining means and the standard image and positional relationship between the standard substrate and the image taking means when the standard image is obtained, and registering the positional relationships in the memory.

Each of the means described above may be realized by a computer having installed therein a program for carrying out the process for the corresponding means. The image taking control means serves to carry out Step 1 for the method of the first example, the image synthesizing means serves to carry out Step 2 and the standard image extracting means serves to carry out Steps 3 and 4. The condition determining means serves to carry out Step C1 and the registering means serves to carry out not only Step C2 but also the process of extracting the positional relationship between the standard image and the image taking means and registers the results of these processes in the memory. The positional relationship between the standard image and the image taking means can be extracted as that between the target area set by the standard image extracting means and the whole image and may be obtained as the relative coordinates of a specified point in the target area with respect to a specified standard point on the whole image.

Apparatus of this invention for carrying out the aforementioned second example of the method of this invention may be characterized as further comprising condition determining means for determining setting conditions of an inspection area for a specified target portion on the substrate based on design data of the substrate, positional relationship determining means for determining positional relationship between the image taking means and the substrate such that the inspection area according to the conditions determined by the condition setting means is included in the field of vision of the image taking means, image taking control means for controlling the moving means and the image taking means such that, when a standard substrate with a good quality is supported on the substrate stage, the substrate is photographed while being in the positional relationship determined by the positional relationship determining means with respect to the image taking means, detecting means for detecting the target portion on an image obtained by control by the image taking control means and displacement values of the target portion with respect to the inspection area when the inspection area is set on the image by the setting condition determined by the condition determining means, correcting means for correcting setting position of the inspection area based on the displacement values detected by the detecting means, and registering means for registering in the memory image created by the image taking control means as the standard image, positional relationship between the image taking means and the substrate determined by the positional relationship determining means and positional relationship between the inspection area based on the corrected setting position by the correcting means and the standard image.

Each of the means described above may also be realized by a computer having installed therein a program for carrying out the process for the corresponding means. The condition determining means serves to carry out Step 1 for the method of the second example, the positional relationship determining means serves to carry out Step A2, the detecting means serves to carry out Steps C1 and C2 and the correcting means serves to carry out Step C3.

According to this invention, a target image for processing is matched with a preliminarily prepared whole image of the substrate to extract the relative positional relationship between the two images and an inspection area necessary for the target image is set based on the results of this extraction and the correspondence relationship between the whole image and the inspection area. Thus, displacement of the inspection area due to errors in the motion when the stage parts move the camera or the substrate can be eliminated and the accuracy of inspection can be improved.

DETAILED DESCRIPTION OF THE INVENTION

Figure 1:
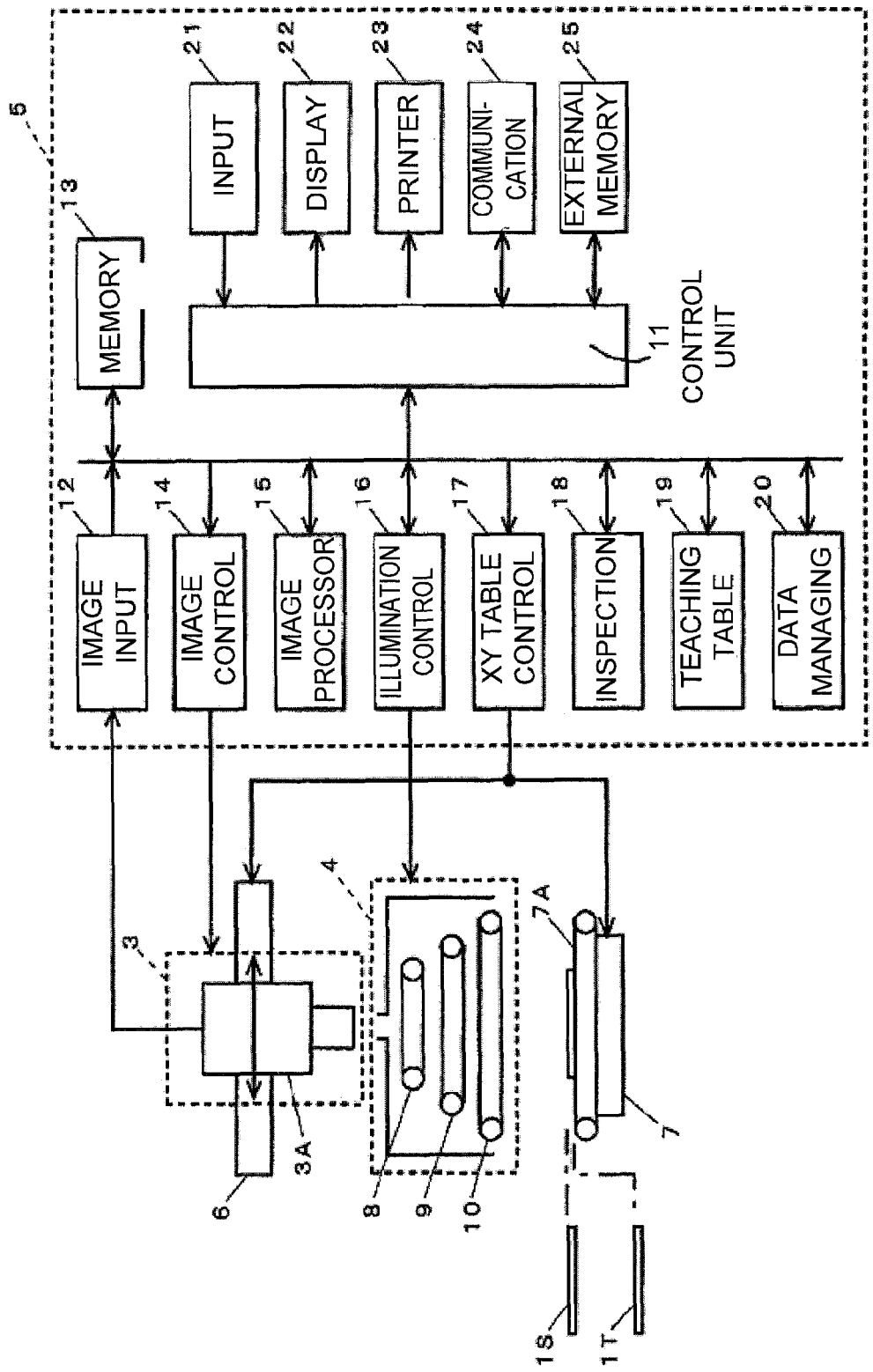
FIG. 1 is a block diagram of a substrate inspection apparatus embodying this invention.

FIG. 1 shows a substrate inspection apparatus embodying this invention, adapted to process an image taken of a target substrate to be inspected and to judge appropriateness of the mounted conditions of the components mounted to the substrate as well as its soldering condition and comprising an image taking part 3, a light emitting part 4, a control part 5, an X-axis table control part 6 and a Y-axis table control part 7. In FIG. 1, symbol 1T indicates the target substrate to be inspected and symbol 1S indicates a standard substrate with mounted components in good conditions and to be used for the teaching process prior to the inspection process.

The Y-axis table control part 7 is provided with a conveyer 7A for supporting the substrates 1T and 1S. The conveyer 7A is moved by means of a motor (not shown) in order to transport the substrates 1T and 1S in the direction of the Y-axis (perpendicular to the paper in the figure). The X-axis table control part 6 supports the image taking part 3 and the light emitting part 4 above the Y-axis table control part 7 and serves to move them in the direction of the X-axis (the left-right direction in the figure).

The light emitting part 4 has three circular ring-shaped light sources 8, 9 and 10 with different diameters and adapted to emit red light, green light and blue light, respectively. As their centers are positioned exactly above the observation position, they will be at different angles of elevation as seen from the substrate 1T or 1S.

The image taking part 3 comprises a CCD camera 3A (hereinafter referred to simply as the camera) for generating a color image with its optical axis matching the center of the light sources 8, 9 and 10 and oriented vertically such that the reflected light from the substrate 1T or 1S will be made incidence to the image taking part 3 and converted into color signals R, G and B of the three primary colors to be inputted to the control part 5.

The control part 5 has a computer inclusive of a CPU serving as a control unit 11 and includes an image input part 12, a memory 13, an image taking controller 14, an image processor 15, an illumination controller 16, an XY table controller 17, an inspection part 18, a teaching table 19, a data managing part 20, an input part 21, a CRT display part 22, a printer 23, a communication part 24 and an external memory device 25.

The image input part 12 is provided with an amplifier circuit for amplifying the image signals R, G and B from the image taking part 3 and an A/D converter circuit for converting these image signals into digital signals. The memory 13 serves to store not only digital gradient image data R, G and B but also binarized image data obtained by processing these gradient image and color phase data.

The image taking controller 14 is provided with an interface for connecting the image taking part 3 to the control unit 11 and serves to carry out various controls such as driving the image taking part 3 based on commands from the control unit 11 and adjusting the output level of each color light. The illumination controller 16 is for regulating the light quantity for each light source of the light emitting part 4. The light quantities for the light sources 8, 9 and 10 may be adjusted such that white light will be projected for illumination.

The XY table controller 17 includes an interface for connecting the X-axis and Y-axis table control parts 6 and 7 with the control unit 11 and serves to control the motions of these table control parts 6 and 7 based on commands from the control unit 11.

The teaching table 19 is a memory part for storing inspection data for substrates and is provided inside a non-volatile memory such as a hard disk device. The inspection data include a standard image of substrate to be explained below, setting data of inspection areas and target areas for inspection, kinds of programs to be executed at each inspection area, parameters corresponding to image processing to be carried out (such as threshold values for binarization processes and filters for edge extraction) and judgment standard values for judging appropriateness of extracted characteristic quantities).

These inspection data are "taught" prior to an inspection by using an image taken of the standard substrate 1S or preliminarily registered standard inspection data. They are arranged as a judgment file for each kind of substrates. The aforementioned data managing part 20 is a memory for storing the link data that correlate between the kinds of substrates and the judgment files. After the name of the target substrate 1T is inputted, the control unit 11 reads out the judgment file corresponding to it based on the link data in the data managing part 20 and sets it in the memory 13. The image processor 15 and the inspection part 18 carry out their processing based on the inspection data in the judgment file which has been read out.

At the time of the inspection, the image processor 15 processes the color images stored in the memory 13 for each inspection area and thereby measures characteristic quantities necessary for the inspection such as the areas, the positions of the centers of gravity and the color patterns of the target portions to be inspected. The inspection part 18 compares the characteristic quantities extracted by the image processor 15 with the standard data and thereby judges appropriateness of each target portion.

The results of these judgment processes are gathered together and the control unit 11 judges whether the target substrate 1T is a good product or not. This final judgment result is outputted to the CRT display part 22 (hereinafter referred to simply as the display part) and the printer 23 or the communication part 24.

The input part 21 is for inputting various conditions and inspection data for an inspection and comprises a keyboard and a mouse. The display part 22 receives image data and inspection results from the control unit 11 and displays them on a display screen. The printer 23 serves to receive inspection results from the control unit 11 and to print them out in a predetermined format.

The communication part 24 is for exchanging data with other apparatus. In the case of a target substrate 1T determined to be defective, its ID data and a description of its defects may be transmitted to a repairing apparatus on the downstream side such that the defective part can be quickly repaired. The external memory device 25 is for reading and writing data from and into a memory medium such as a flexible disk, a CD-R or a magneto-optical disk and is used for saving the inspection results and taking in programs and setting data necessary for the inspection from outside. The communication part 24 and the external memory device 25 may be used for introducing CAD data on a substrate when a test area or a target area for taking in an image is set during the teaching prior to the inspection.

In the above, the image processor 15 and the inspection part 18 may each comprise a dedicated processor having a program for the aforementioned processes installed but it is not always necessary to provide dedicated processors. The control unit 11 may be provided with the functions of the image processor 15 and the inspection part 18.

The setting conditions of inspection areas (such as the positions and the sizes of the inspection areas) may be created by using CAD data. This principle will be explained next with reference to FIG. 2 wherein numeral 100 indicates a standard image obtained from the standard substrate 1S and intended to represent the whole of the substrate 1S. Numeral 101 is a so-called map image for showing the distribution of inspection areas 102 on the standard image 100. Each of these inspection areas is set by matching with the position and size of the target inspection portion shown by the CAD data of the substrate.

In summary, the map image represents data on the positions and sizes of the inspection areas on the substrate, or the setting conditions of the inspection areas. These setting conditions may comprise coordinate data $(x_n$ and $y_n)$ representing the positions of the inspection areas and numbers representing their widths. For the simplicity of description, the setting conditions of inspection areas are hereinafter referred to as a map image.

The substrates 1T and 1S according to this example are provided with positioning marks 105 and 106 respectively at the lower right-hand corner and the upper left-hand corner. The CAD data also include corresponding positioning marks 105a and 106a.

Figure 2:
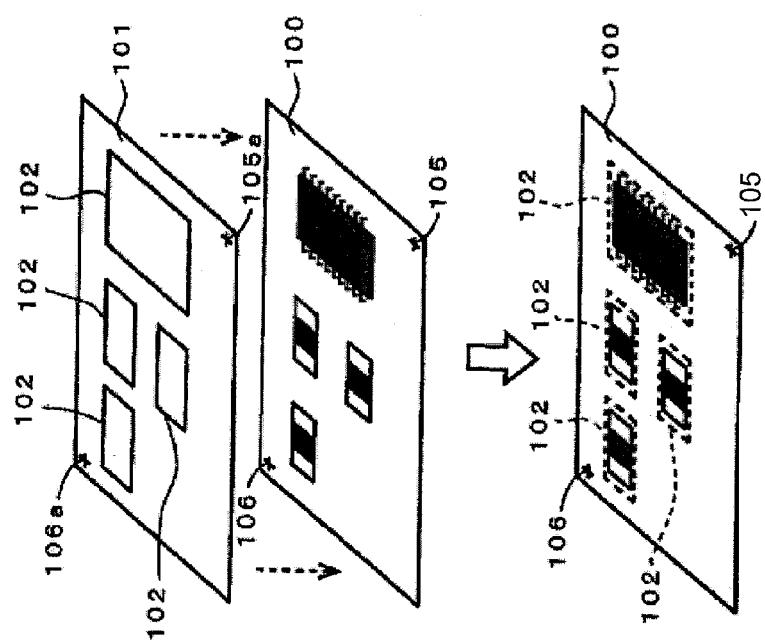
FIG. 2 shows the relationship between a standard image and inspection areas of a substrate.

In the example of FIG. 2, after the standard image 100 and the map image 101 are positioned such that the positioning marks 105a and 106a on the map image 101 will match the positioning marks 105 and 106 on the whole image 100, the positions and sizes of the inspection areas 102 on the map image 101 are identified as the setting data of the inspection areas 102. By thus matching the coordinate system of the standard image 100 with that of the map image 101, an inspection area with a size sufficiently large to include any target inspection portion can be set at an appropriate position.

In the example of FIG. 2, inspection areas 102 are set by considering a portion including the main body part of a component and its electrode part as one target inspection position, this is not intended to limit the scope of the invention. The main body portion, the electrode portion and the soldering portion (such as fillet) may be considered as separate inspection portions when inspection areas 102 are set.

Thus, if the setting positions and sizes of the inspection areas 102 with respect to this standard image 100 are registered in the teaching table 19, the inspection areas 102 can be set also for the image of the target substrate 1T by using the positioning marks of its image and under the same conditions as for the standard substrate 1S. If the position of the standard substrate 1S is registered as relative coordinates with respect to the positioning marks 105, even when the image of the target substrate 1T is displaced with respect to the standard image 100, inspection areas corresponding to each target portion can be set at correct positions based on the positioning mark 105 on its image.

If the substrate 1T or 1S is larger than the field of vision of the camera 3A and images need to be taken of a plurality of target areas, a standard image will have to be registered for each of the target areas and setting conditions of inspection areas must be determined for each standard image.

In order to obtain a standard image for each target area in such a situation, it is necessary to first obtain an image of a target area including a positioning mark (such as the one at the lower right-hand corner) by adjusting the positional relationship between the camera 3A and the substrate such that the positioning mark 105 on the image will be at a preliminarily determined standard coordinate and, for the other target areas, to control the motion of the X-axis and Y-axis table control parts 6 and 7 based on their relative coordinates (obtained from the map image 101 of the whole substrate) such that the field of vision of the camera 3A will match each of the target areas.

For determining the setting conditions of an inspection area, an image of the target area is extracted from the map image 101 of the whole substrate based on the relative coordinates of the target area with respect to the positioning mark, and this extracted map image and the standard image are "superposed", that is, the position data and size data of the inspection area obtained from the CAD data are converted to the coordinate system of the standard image.

Since the movements by the table control parts 6 and 7 include errors, there is a possibility of a displacement in the field of vision of the camera 3A with respect to the target area at the time of actually taking the image. Thus, although the image extracted from the map image 101 corresponds correctly to the target area, the standard image is displaced from the target area and the inspection area 102 may not be able to be set at a correct position even if both positions are matched.

In the four examples that are explained below, therefore, a substrate which requires a plurality of target areas to be set is used as the target of inspection, and a standard image is prepared for each of the target areas such that the position of the inspection area can be accurately determined corresponding to this standard image.

Since displacements of the field of vision of the camera 3A occur also at the time of an inspection, the target image obtained by the camera 3A is matched with the standard image in each of the examples in order to detect the amount of displacement of the field of vision of the camera 3A and this amount of displacement is used to correct the setting data of the inspection area. Moreover, the process of setting the inspection area to the target image is carried out by using the setting data after this correction.

EXAMPLE 1

By this example, after the standard substrate 1S is divided into a plurality of areas to photograph, the images of the individual areas are connected together to produce a whole image of the standard substrate 1S and registered. Overlapped areas of width of a specified number of pixels are set between each pair of mutually adjacent areas corresponding to the error generated by the motions of the X-axis and Y-axis table control parts 6 and 7 (referred to as the machine error). On each of these images, a pattern matching process is carried out by using the image data of these overlapped portions and after the corresponding relationships of pixels are adjusted based on the result of this matching process, corresponding pixels are overlapped to obtain a correct whole image.

Figure 3:
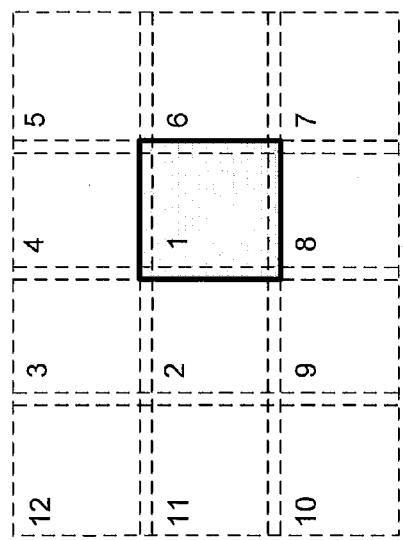
FIG. 3 is a drawing for showing an example of sequence in which the process of overlapping images is carried out to obtain a whole image.

FIG. 3 shows an example of the process for overlapping images, the order in which the images are connected being indicated by circled numerals. In this example, one of the images in the center part is designated as the first image and the other images are sequentially overlapped in the clockwise direction. The average density value of the pixels before the overlapping is carried out is assigned to each of the pixels in the overlapped area.

Figure 4:
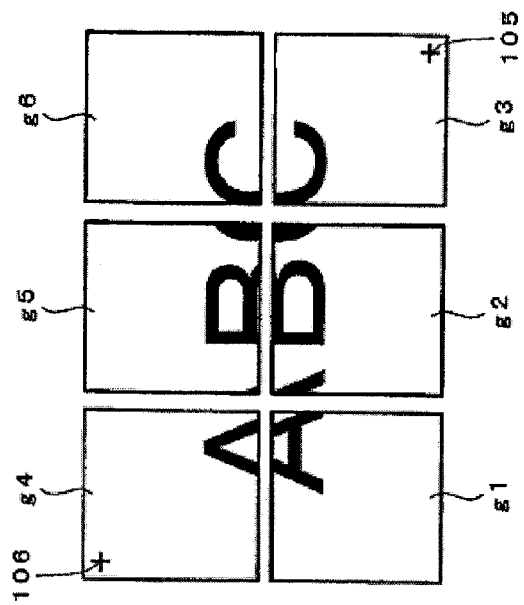
FIG. 4 shows an example of six images prepared for producing a whole image.
Figure 5:
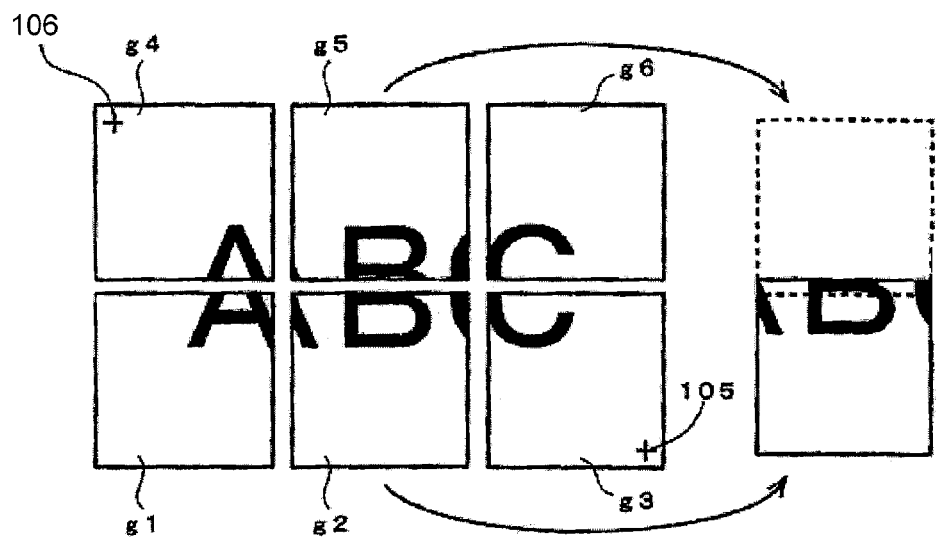
FIG. 5 shows a process by which the six images shown in FIG. 4 are used to form a whole image.
Figure 6:
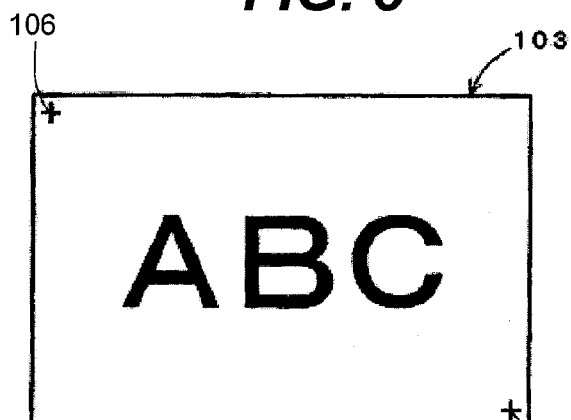
FIG. 6 shows the whole image formed by the process shown in FIG. 5.

FIGS. 4-6 show a method of forming a whole image by using character array "ABC" for convenience to represent a distribution pattern of components on a substrate. In this example, the target substrate to be processed is divided into six target areas to be photographed to obtain six images g1-g6. In this example, the image g2 at the lower center is set first, as shown in FIG. 5, to start the overlapping process to make a whole image. Thereafter, the method explained above with reference to FIG. 3 is used and the images g5, g6, g3, g1 and g4 are overlapped sequentially in this order and a whole image 103 as shown in FIG. 6 is completed.

According to this example, inspection areas are set on the whole image 103 by the method explained above with reference to FIG. 2 such that a plurality of target areas are set on the substrate based on the distribution condition of the inspection areas. Thus, the whole image 103 in this case may be considered to include the standard images of these target areas. Since the whole image 103 is obtained by properly joining the overlapping parts of the individual images g1-g6 with their overlapping parts prepared by taking into consideration the machine errors of the X-axis and Y-axis table control parts 6 and 7, an image may be cut out from this whole image 103 to obtain a standard image similar to the image that would obtain if the field of vision of the camera 3A is positioned correctly for the corresponding target area.

At the time of an inspection, the field of vision of the camera 3A cannot be set correctly to the target area which was set as explained above because of the machine errors of the X-axis and Y-axis table control parts 6 and 7. This displacement of the field of vision of the camera 3A can be detected as the displacement of the target image with respect to the target area on the whole image 103.

Figure 7:
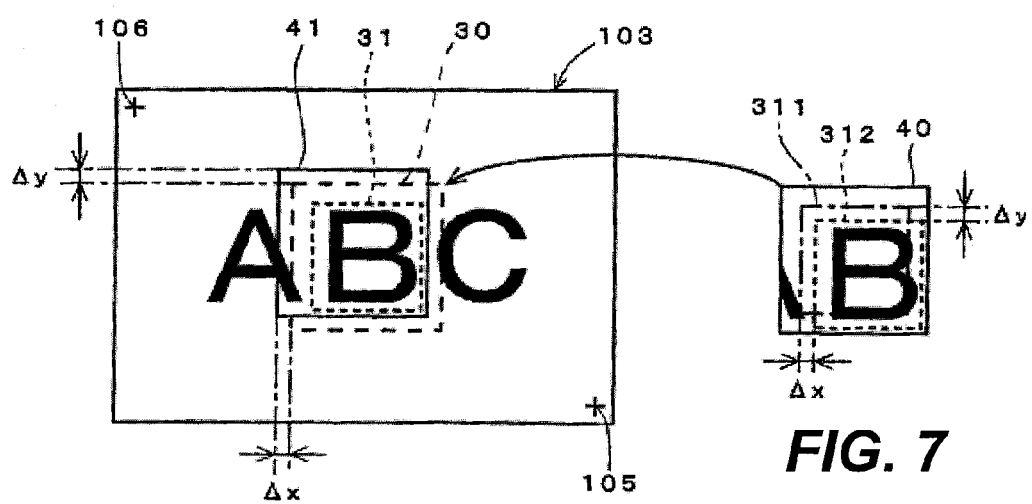
FIG. 7 shows a process for detecting the displacement of a target image.

FIG. 7 is a drawing for explaining the process for detecting the displacement. Numeral 31 in FIG. 7 indicates an inspection area set on the basis of a whole image 103 and numeral 30 indicates a target area on the whole image 103. The image that is inside this target inspection area 31 functions as the standard image for the inspection. Although only one inspection area 30 is set in this example, a plurality of inspection areas may be contained within this single target area 30.

Numeral 40 in the figure indicates a target image created by the camera 3A at a matching position with the target area on the actual substrate. Numeral 41 indicates the area (hereinafter referred to as the corresponding area) on the whole image 103 where an image corresponding to the target image 40 is obtained. If the field of vision of the camera 3A is correctly positioned, this corresponding area 41 should match the target area 30. In this illustrated example, however, the field of vision of the camera 3A is not correctly positioned due to machine errors of the X-axis and Y-axis table control parts 6 and 7 and hence there are resultant displacement values $\Delta x$ and $\Delta y$ from the target area 30.

The positions of the inspection area 31 and the target area 30 are registered as coordinates of the same coordinate system as that of the whole image 103 of the substrate. If the positional relationship between these areas 30 and 31 in this coordinate system is directly used on the target image 40, the inspection area 31 will be displaced from the proper position where it should be set (as shown by numeral 311 on the target image 40).

In the present example, the aforementioned corresponding area 41 is extracted corresponding to the target image 40 by a pattern matching process (also referred to as a correlation matching process) and thereafter displacement values $\Delta x$ and $\Delta y$ of the corresponding area 41 from the target area 30 are calculated for both the horizontal direction and the perpendicular direction, and the setting position of the inspection area 31 on the target image 40 is corrected from the displacement values $\Delta x$ and $\Delta y$. The corrected inspection area is shown by a dotted line indicated by numeral 312 on the target image 40. Thus, the inspection area 31 can be set at a position relative to the target portion (letter B in this example) as on the whole image 103 such that a correct inspection result can be obtained.

By a conventional method, the field of vision of the camera 3A and the target area are matched as explained above at the beginning of an inspection from the displacement of the substrate extracted from the images of the positioning marks 105 and 106 on the image of the substrate and nothing more. As a result, it is the image within the displaced inspection area 311 that is processed on the target image 40. Although the accuracy of positioning of the inspection area 311 can be improved by reducing the machine errors of the X-axis and Y-axis table control parts 6 and 7, this will require driving mechanisms with high accuracy which will be costly.

By the example of FIG. 7, by contrast, displacement values $\Delta x$ and $\Delta y$ of the target image 40 from the target area 30 on the whole image 103 are extracted and used to correct the setting position of the inspection area 31 and hence it becomes possible to set the inspection area with an error of the order of one pixel. Thus, the inspection area can be set accurately independent of the capability of the driving mechanisms for the X-axis and Y-axis table control parts 6 and 7 and an image processing necessary for the inspection can be carried out.

While the whole image 103 is created by using the standard substrate 1S known to be of a good quality, the target image 40 obtained by photographing the target substrate 1T is likely to include defective portions. Although there may be some defective portions, it may be expected that images similar to those obtained from the whole image 103 are obtained from the remaining portions. Thus, if the percentage of the area with defective portions on the target image 40 is small, the area where the correlation value by a pattern matching process is the highest with the target image 40 may be extracted as the corresponding area 41 to obtain the displacement values $\Delta x$ and $\Delta y$.

Figure 8:
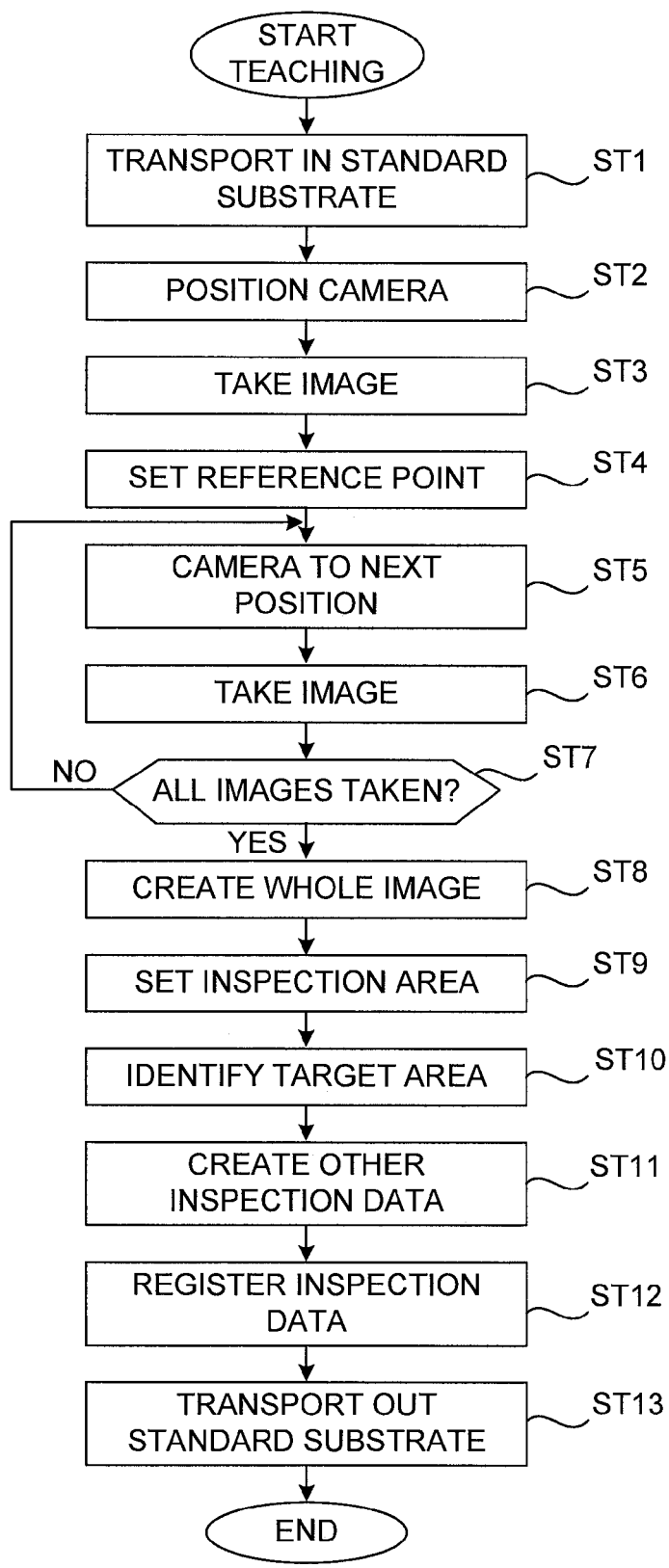
FIG. 8 is a flowchart of the routine for a teaching process.
Figure 9:
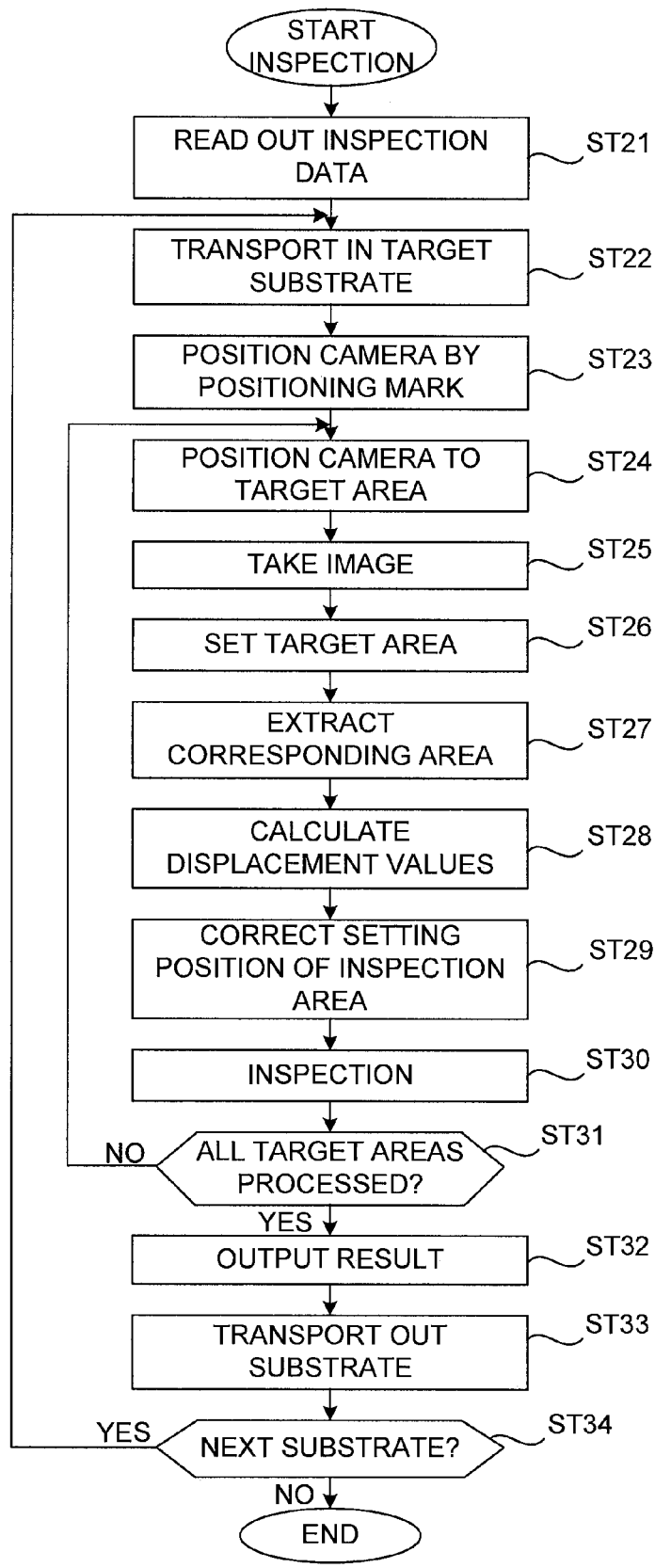
FIG. 9 is a flowchart of an inspection routine.

FIG. 8 shows a routine for a teaching process and FIG. 9 shows a routine for an inspection process to be carried out in Example 1.

The teaching process of FIG. 8 is started as a substrate name and a substrate size are inputted and the standard substrate 1S is transported onto the Y-axis table control part 7 (Step ST1). Next, the number and positions of target areas for creating a whole image are determined and the camera 3A is positioned in a target area containing the positioning mark 105 or 106 (Step ST2).

Next, the positioned camera 3A is operated to take an image (Step ST3) and the image thus taken is temporarily stored in the memory 13 through the image input part 12. This temporarily stored image is displayed next on the display part 22 to cause the user to specify the position of the positioning mark 105 or 106. Its specified coordinates are identified as the coordinates of the reference point (Step ST4). Alternatively, the positioning mark 105 or 106 on the image may be automatically extracted and the coordinates representing the position of extraction may be identified as the reference point.

Next, the X-axis and Y-axis table control parts 6 and 7 are operated to position the camera 3A in the next target area (Step ST5) and the camera 3A is operated and the obtained image is temporarily stored in the memory 13 (Step ST6).

Steps ST5 and ST6 are repeated while the position of the camera 3A is changed with respect to the standard substrate 1S. As all necessary images for creating a whole image have been obtained (YES in Step ST7), all of the images temporarily stored in the memory 13 are superposed sequentially to create a whole image 103 by the method shown in FIG. 3 (Step ST8).

Next, inspection areas are set for each of the target portions on the whole map 103 by the method of creating a map of an inspection area from CAD data corresponding to the standard substrate 1S (Step ST9). This map image is matched with the whole map 103 by means of the positioning marks 105 and 106 and the positions and the sizes of the inspection areas on the map image after this matching process are set as the setting data for the inspection areas.

Next, a window with a size corresponding to the field of vision of the camera 3A is scanned on the map image of the inspection areas and setting positions for target areas for the time of inspection are identified (Step ST10).

Next, other inspection data are created for each of the components on the whole image such as setting position of the inspection window for each target portion to be inspected within the inspection area, kinds of the programs to be carried out, parameters such as threshold values for binarization processes and standard values for judging appropriateness of extracted characteristic quantities (Step ST11). These inspection data may include both those created from standard inspection data preliminarily registered for each type of components (library data) and those created by using the whole image.

Next, judgment files are created by correlating the coordinates of the reference point identified in Step ST4, the whole image created in Step ST8 and the inspection data of various kinds created in Steps ST9-ST11 with the substrate names and are registered in the teaching table 19 (Step ST12). Thereafter the standard substrate 1S is transported out (Step ST13) and the process ends.

The inspection routine of FIG. 9 is started after the teaching process of FIG. 8 is carried out and in response to the input of the substrate name of the target substrate 1T to be inspected and a start command for an inspection. The routine starts by reading out the judgment file of the corresponding substrate and setting it to the memory 13 (Step ST21).

After the target substrate 1T is transported onto the Y-axis table control part 7 (Step ST22), the position mark is used to correct the initial position of the camera 3A with respect to the target substrate 1T (Step 23). This correction process is carried out by matching the field of vision of the camera 3A to an area including the positioning mark 105 or 106 corresponding to the aforementioned reference point to obtain an image, extracting the positioning mark on the created image and obtaining displacement values of the positioning mark with respect to the reference point registered by the aforementioned teaching process. These displacement values are converted into the distance of motion of the X-axis and Y-axis table control parts 6 and 7 and these table control parts 6 and 7 are moved by these distances to adjust the positional relationship between the camera 3A and the target substrate 1T. (The position of the camera 3A are adjusted in the same way also in the subsequent Examples.)

After this position correction process is completed, Steps ST24-ST31 are carried out for each of the target areas.

To start, The X-axis and Y-axis table control parts 6 and 7 are operated to position the camera 3A to the target area under consideration (Step ST24) and a target image to be processed is obtained by the camera 3A (Step ST25). Next, an area of a specified size including the target area under consideration and surrounding images is set on the whole image as the scanning object of the target image (Step ST26). Next, a correlation matching process is carried out at each scanning position by scanning the target image for each pixel to this scanning object area and a corresponding area to the object image is extracted (Step ST27). Thereafter, displacement values Δx and Δy with respect to the target area under consideration are calculated regarding the corresponding area extracted in Step ST27 (Step ST28).

Next, the setting position of the inspection area read out from the teaching table 19 and stored in the memory 13 is corrected by the displacement values Δx and Δy (Step ST29). This is done first by replacing the registered coordinates of the setting position of the inspection area (in the coordinate system of the whole image) by relative coordinates (such as the coordinates as seen from the lower right-hand corner of the target area) with respect to the registered inspection area and then correcting the coordinates after the conversion by the displacement values Δx and Δy.

After this correction, a series of processes related to inspection is carried out such as setting an inspection area on the target image based on the setting position corrected in Step ST29, carrying out measurement and judgment processes on the target portions for the inspection by using the inspection data read out of the teaching table 19 for each inspection area and storing the inspection results in the memory 13 (Step ST30).

After Steps ST24-ST30 are completed over all of the target areas (YES in Step ST31), the results stored in the memory 13 over all of the inspection areas are considered together to determine whether the target substrate 1T under consideration is a good product or not and the result of this judgment is outputted (Step ST32). The inspected target substrate 1T is thereafter transported away (Step ST33) and Steps ST22-ST33 are repeated for all other substrates to be processed (Step ST34).

EXAMPLE 2

In this example and the examples that follow, methods of setting a target area and an inspection area and methods of detecting the displacement between a target image and a target area will be explained more in detail for the inspection of soldered portions (or fillets) of a component.

With a set-up as shown in FIG. 1, since the colored light from the light sources 8, 9 and 10 of the light emitting part 4 is normally reflected by the surface of a fillet, an image with red, green and blue colors distributed at a specified rate according to the slope of the fillet can be obtained. For the inspection of a fillet, these colors are independently extracted and their positions and areas are compared with standard values in order to judge the appropriateness of the sloped condition.

Figure 10:
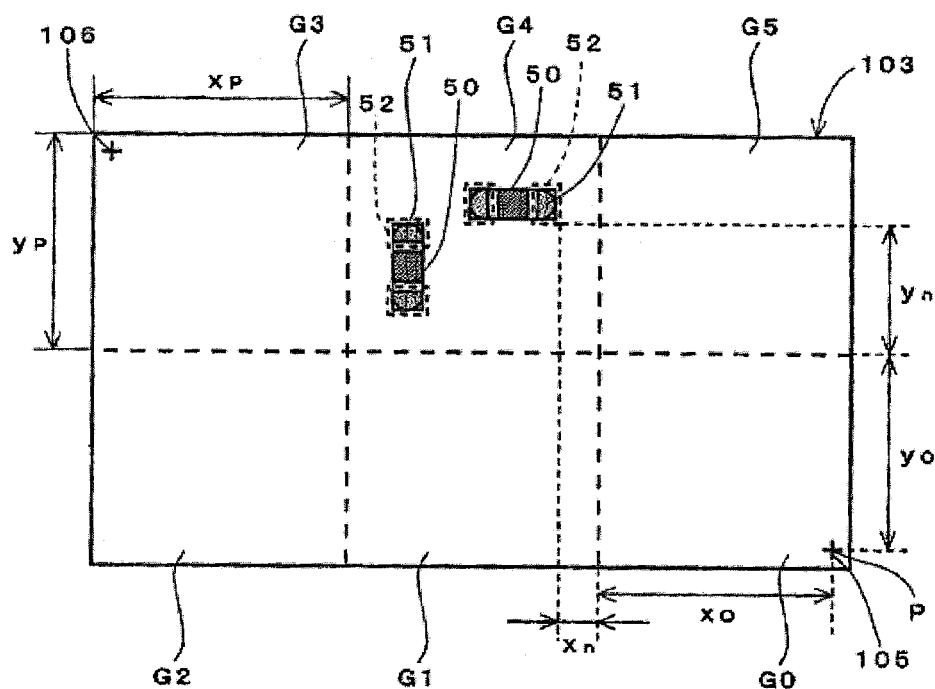
FIG. 10 is a view of the whole image of Example 2.

FIG. 10 shows the whole image 103 of a substrate. Like the example shown in FIGS. 4 and 5, this whole image 103 is also formed by superposing six images, that is, three images in the horizontal x-direction and two images in the perpendicular y-direction. For the sake of simplicity of description, superposed parts between mutually adjacent images are not illustrated in FIG. 10.

In Example 2, images of target areas are obtained (photographed) under the same condition as when the whole image 103 is obtained. Thus, the whole image 103 is divided into area portions corresponding to the target areas (to be photographed) and the images G0-G5 of the six area portions are registered as standard images. As the data for the movements of the X-axis and Y-axis table control parts 6 and 7 for matching the position of the field of vision of the camera 3A, the horizontal and perpendicular dimensions $x_p$ and $y_p$ (where p=0-5) of these area portions are also registered.

In the above, the reason for obtaining the standard images G0-G5 after creating the whole image 103 by cutting it is to eliminate the machine errors that may be caused when images are taken for obtaining the standard images.

For the sake of convenience, FIG. 10 shows two components 50 only on one of the area portions (corresponding to image G4). These components 50 are shown as chip components each having electrodes on both end parts. Numeral 51 indicates a fillet and numeral 52 indicates an inspection area corresponding to this fillet 51.

As the setting position of each inspection area 52, the coordinates of the lower right-hand corner of that inspection area 52 are registered in this example. These coordinates ($x_n$, $y_n$) are taken relative to the lower right-hand corner of the image that contains this inspection area 52. Although not shown in FIG. 10, the horizontal and perpendicular dimensions of the inspection areas 52 are also registered as data indicative of their sizes.

Figure 11:
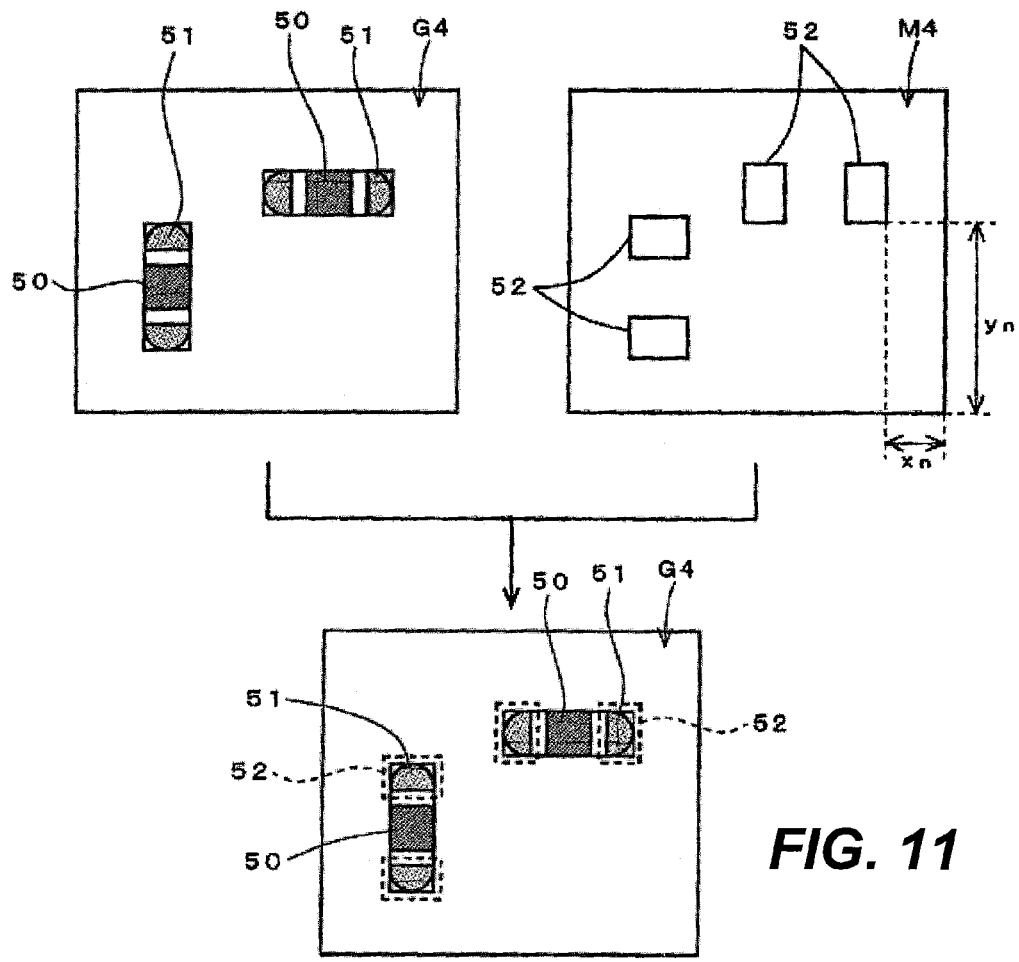
FIG. 11 is a drawing for showing the relationship between a standard image and an inspection area.

FIG. 11 is used next to explain how the setting position of an inspection area is identified. In this process, data regarding the area corresponding to each standard image are extracted from the CAD data of the substrate, those of the extracted data representing the fillet 51 are identified and the setting condition of the inspection area is determined according to the position and the size of the target portion to be inspected.

FIG. 11 shows a standard image G4 at the upper center of the whole image 103 and a map image M4 showing the distribution condition of the inspection areas on this standard image G4. As explained with reference to FIG. 2 above, the map image M4 and the standard image G4 are position-matched to apply the positions and sizes of the inspection areas 52 on the map image M4 such that appropriate inspection areas 52 are set for each fillet 51 on the standard image G4.

In this example, as shown in FIG. 10, the center point P of the positioning mark 105 at the lower right-hand corner of the substrate is used as the reference point for the purpose of creating map images corresponding to the standard images G0-G5 such that the coordinate systems of the whole image 103 and the CAD data can be matched. Data on the positioning marks are also included in the CAD data and since the positioning marks are accurately formed on the substrate, it is justified to select the reference point P with reference to one of the positioning marks (105).

The position of each point on the whole image 103 can be expressed in terms of the relative coordinates with respect to the reference point P. With reference to FIG. 10, if the distances from the reference point P to the boundary lines between the image G0 including the reference point P and the images G1 and G5 that are adjacent thereto are expressed as $x_0$ and $y_0$, the coordinates of the lower right-hand corner of the aforementioned inspection area 51 on the standard image G4 become $(x_0+x_n, y_0+y_n)$.

At the time of inspection according to this example, the camera 3A is positioned for the same target area as when the whole image 103 was obtained to create target images corresponding to the standard images G0-G5. Because of machine errors, however, there is a possibility that the field of vision of the camera 3A may not correctly match the target area and there may be a displacement between the registered standard image and the target image to be processed. Thus, the positional displacement of the target image is extracted and the inspection area is corrected, as explained above regarding Example 1.

Figure 12:
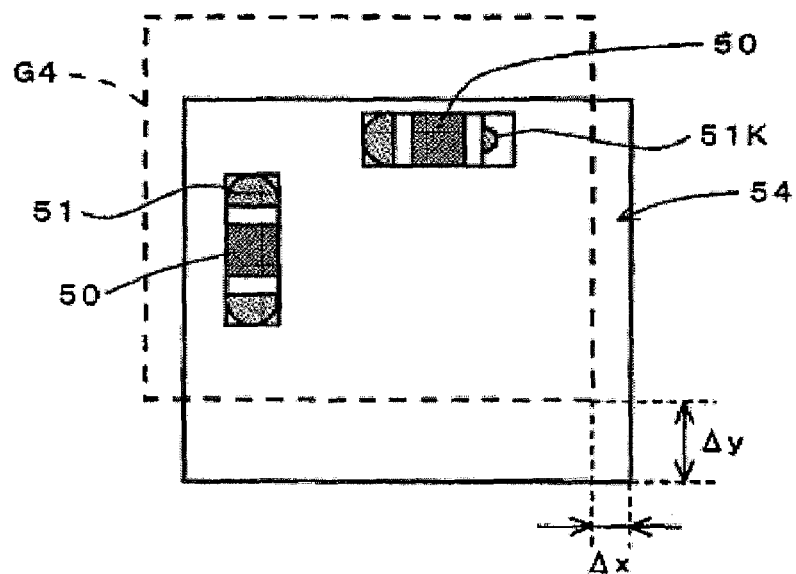
FIG. 12 shows the process of detecting displacement values of a target image.

FIG. 12 shows a target image 54 corresponding to and displaced from the standard image G4. Moreover, one (51K) of the four target portions 51 on the target image 54 is shown to be defective. In this example, the standard image G4 is scanned for each pixel with respect to the target image 54 and correlation values are calculated where the two images overlap such that the displacement values $\Delta x$ and $\Delta y$ between the two images when the correlation value is the highest are judged to be the displacement values of the target image 54 with respect to the standard image G4. Even if there is a defective part, since the remaining parts other than the defective part 51K are similar to the standard image 54, it may be concluded that the correlation value becomes the largest when the standard image G4 has moved to the best matching position.

Figure 13:
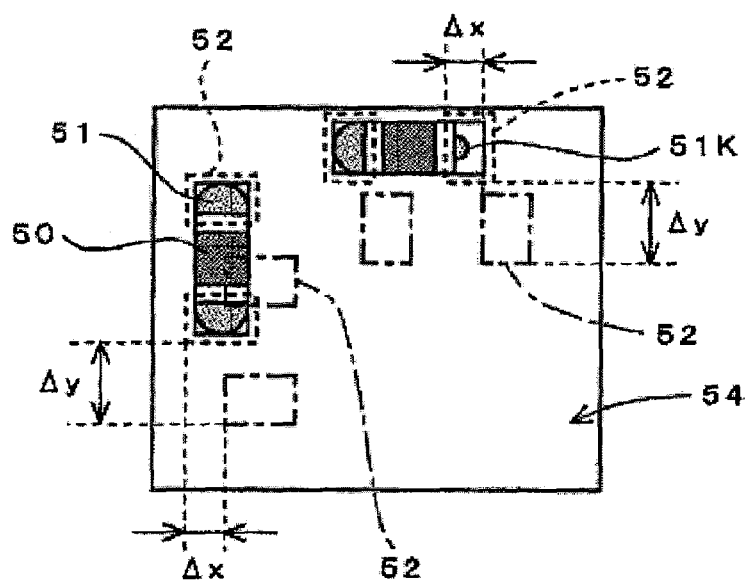
FIG. 13 shows the process of correcting inspection areas.

FIG. 13 shows how the positions of the inspection areas 52 which are set under the same conditions as the standard image G4 are corrected by using the displacement values $\Delta x$ and $\Delta y$.

In this manner, appropriate inspection areas 12 can be set for all fillets 51 and 51K such that an accurate inspection is made possible.

Figure 14:
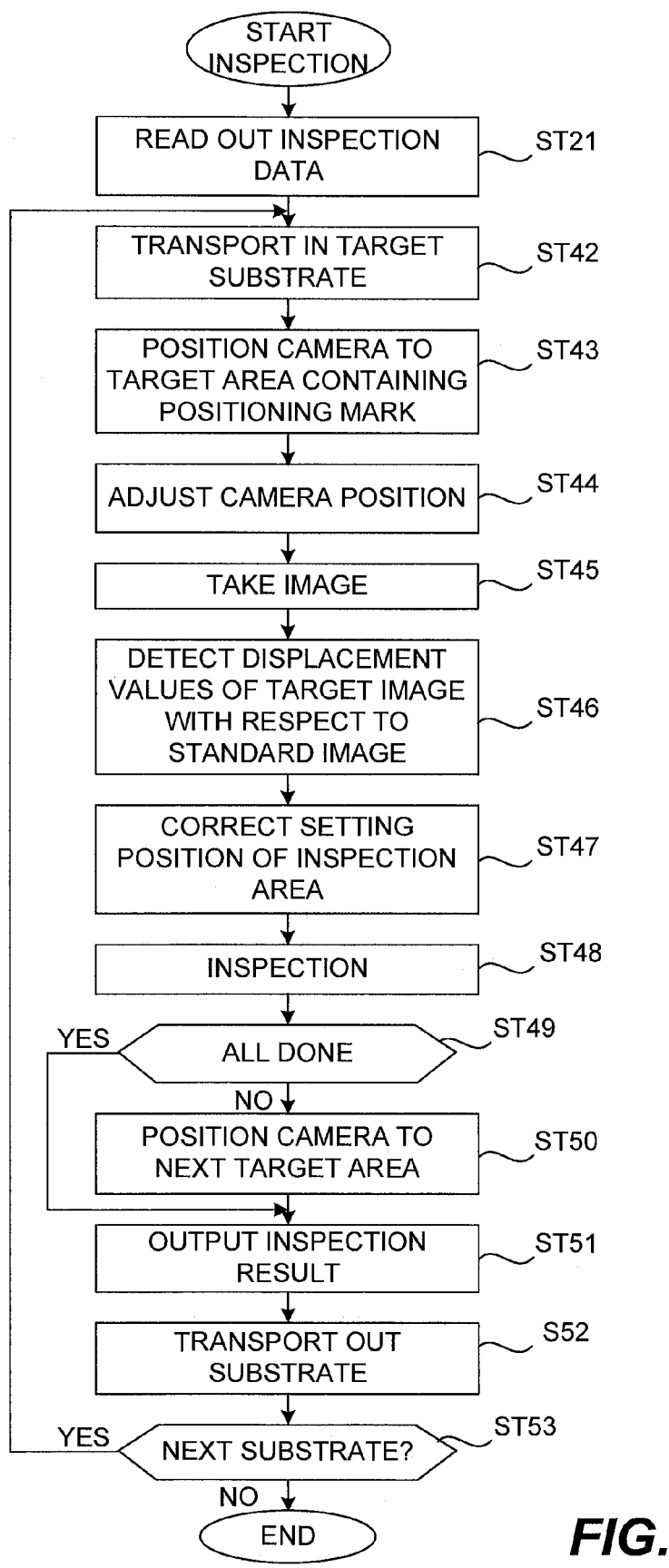
FIG. 14 is a flowchart of another inspection routine for Example 2.

In Example 2, too, a teaching process similar to the routine shown by FIG. 8 can be carried out except that the individual images G0-G5, instead of the whole image, are registered as standard images. Thus, no separate flowchart will be shown for this example and FIG. 14 is referenced next to explain the inspection routine.

The inspection routine for Example 2 starts by reading out the inspection data of the desired target substrate from the teaching table 19 (Step ST41) and storing them in the memory 13. As the target substrate 1T is transported in (Step ST42), the camera 3A is positioned for the target area including the positioning mark 105 corresponding to the reference point P (corresponding to the standard image G0) (Step ST43).

Next, an image is taken by the camera 3A, the center point of the positioning mark 105 is extracted on the obtained image and the displacement of the extracted position with respect to the reference point P is obtained. The X-axis and Y-axis table control parts 6 and 7 are operated according to this displacement to adjust the position of the camera 3A (Step ST44). Since there is a possibility of machine errors also at this time of adjustment, causing a displacement of the field of vision of the camera 3A with respect to the target area, another image is obtained by the camera 3A after this positional adjustment (Step ST45). After a target image is obtained corresponding to the standard image G0, Steps ST46 and ST47 are carried out to set an inspection area on the target image free of the effects of the machine errors.

In Step ST46, a correlation matching process is carried out between the created target image and the standard image G0 to detect displacement values $\Delta x$ and $\Delta y$. This process is similar to the process explained earlier with reference to FIG. 12 as the method of detecting the displacement values of the target image 54 with respect to the standard image G4.

After these displacement values $\Delta x$ and $\Delta y$ are used to correct the setting position of the inspection area in Step ST47, an inspection is carried out by using the image data of the corrected inspection area (Step ST48).

Thereafter, if not all target areas have been processed (NO in Step ST49), the camera 3A is positioned for the next target area (Step ST50). If the camera 3A is to be set for the target area corresponding to the standard image G1, for example, the X-axis table control part 6 is moved by an amount corresponding to the distance of $x_p$. If the camera 3A is to be set for the target area corresponding to the standard image G5, the Y-axis table control part 7 is moved by an amount corresponding to the distance of $y_p$. Thereafter, Steps ST45-ST48 are repeated to sequentially obtain images corresponding to all standard images and detection of displacements with respect to the standard image, correction of inspection areas and inspection are carried out. After all target areas have been processed (YES in Step ST49), the results of the inspection are outputted (Step ST51) and the target substrate 1T is transported out (Step ST52). Steps ST42-ST52 are repeated until all target substrates are processed (NO in Step 53).

EXAMPLE 3

Figure 15:
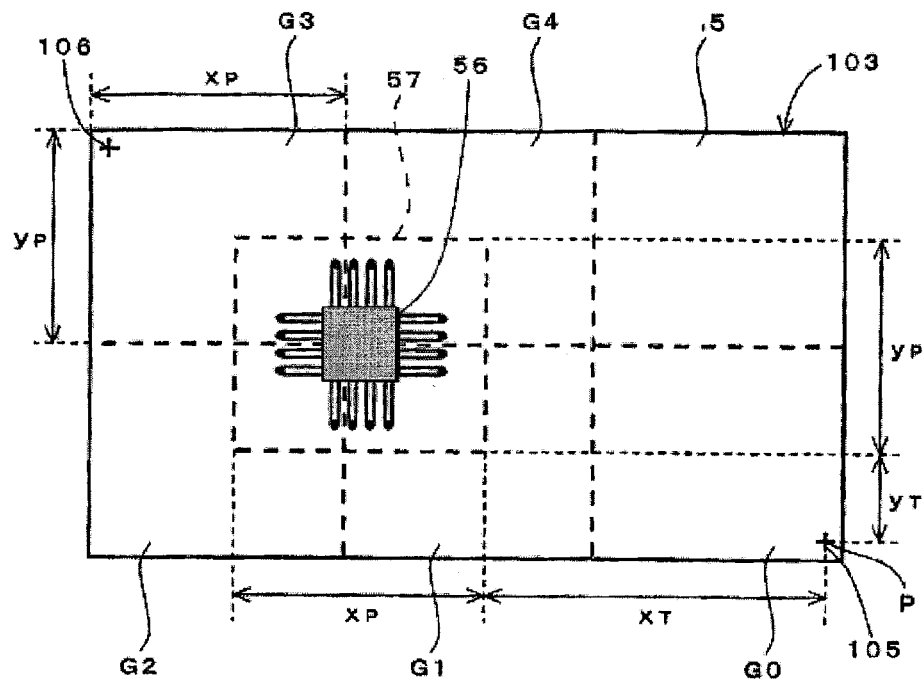
FIG. 15 is a whole image of Example 3.

Example 2 presumed that the target portion to be examined is contained within any one of the images that comprise the whole image. There are situations as shown in FIG. 15, however, where a component (QFP) 56 to be examined is positioned so as to span over a plurality of images. In such a situation, it is desirable to be able to set a target area at an arbitrarily selectable position on the whole image 103 as in the case of Example 1.

In Example 3, after the whole image 103 of the standard substrate 1S has been created, a target area 57 is set on this whole image 103 so as to wholly contain this component 56 in question and the setting position of this target area 57 is registered. The image inside the target area 57 is cut out and is registered as the standard image.

In the above, the setting of the target area 57 can be carried out by using the map image of the substrate but another method is to display the whole image 103 on the display part 22 and to receive the user's setting operations on this display screen. It also goes without saying that the dimensions of this target area 57 are also $x_p$ and $y_p$.

Figure 16:
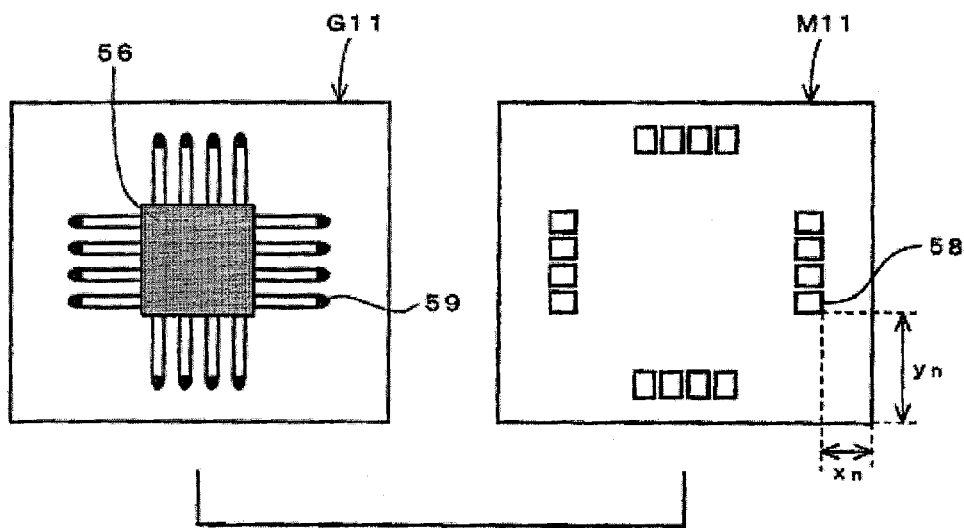
FIG. 16 is a drawing for showing the relationship between a standard image and an inspection area for Example 3.
Figure 16:
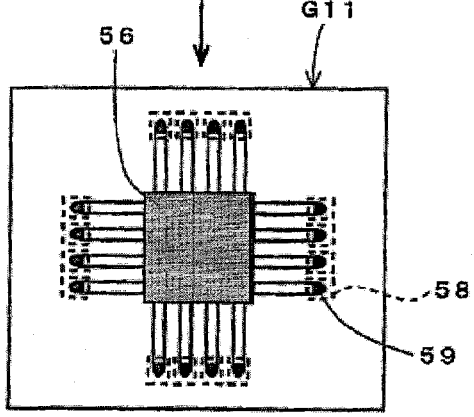

FIG. 16 shows the standard image G11 cut out of the target area 57 on the whole image 103, as well as the map image M11 of the inspection areas distributed over this standard image G11. In FIG. 16, numeral 59 indicates a fillet corresponding to one of the lead lines of the component 56 and numeral 58 indicates the inspection area corresponding to this fillet 59.

The map image M11 of this example can be created, as in the case of Example 2, by matching the coordinate systems of the whole image 103 and the CAD data and thereafter extracting the data of areas corresponding to the standard image G11 from the CAD data. The setting position of each inspection area 58 on the map image M11 can also be expressed by relative coordinates $(x_n, y_n)$ of the lower right-hand corner of the inspection area 58 as seen from the lower right-hand corner of the image.

The setting position of the target area 57 on the whole image 103 may be set by the relative coordinates $(x_T, y_T)$ of the lower right-hand corner of this area as seen from the reference point P, as shown in FIG. 15. An area corresponding to the standard image G11 may be identified on the CAD data for determining the setting conditions of the inspection area by matching the coordinate systems of the whole image and the CAD data based on the reference point P and thereafter setting an area with dimensions of $x_p$ and $y_p$ with the lower right-hand corner at $(x_T, y_T)$.

The position of the camera 3A can be matched with the target area 57 on the substrate at the time of inspection by adjusting the positional relationship between the substrate and the camera 3A based on the reference point P by a process similar to Steps ST43 and ST44 of FIG. 14 and thereafter moving the X-axis and Y-axis table control parts 6 and 7 respectively by a distance corresponding to the sum of the value of $x_T$ and $y_T$ and the coordinate of the reference point P.

After the position of the camera 3a has been matched as explained above, the displacement values Δx and Δy of the target image with respect to the standard image may be extracted similarly as in Example 2 and these values Δx and Δy can be used to correct the position of the inspection area.

The teaching and inspection routines for Example 3 are similar to those for Examples 1 and 2 and hence repetitious explanations will be omitted.

In the description of Examples 2 and 3 above, the whole image 103 of the standard substrate 1S is created first and thereafter an image corresponding to a target area is cut out of this whole image and registered as the standard image but it may be the whole image 103 that is registered as in Example 1. In such a case, the displacement values of the target image with respect to the standard image may be detected at the time of inspection by cutting out the standard image from the registered whole image and carrying out the correlation matching process between the standard image that has been cut out and the target image.

EXAMPLE 4

Example 4 also relates to a substrate as shown in FIG. 15, a target area 57 is set so as to wholly include a component 56 and the image in this target area 57 is registered as the standard image G11. Unlike Example 3, however, the whole image 103 is not created and the setting position of the target 57 including the component 56 is identified on the CAD data and an image to become the standard image G11 is obtained by matching the position of the camera 3A with the target area of the standard substrate 1S. Since the effects of machine errors of the X-axis and Y-axis table control parts 6 and 7 must be taken into consideration when a standard image is created by such a method, however, a teaching process is carried out in Example 4 by a routine as shown in FIG. 17.

Figure 17:
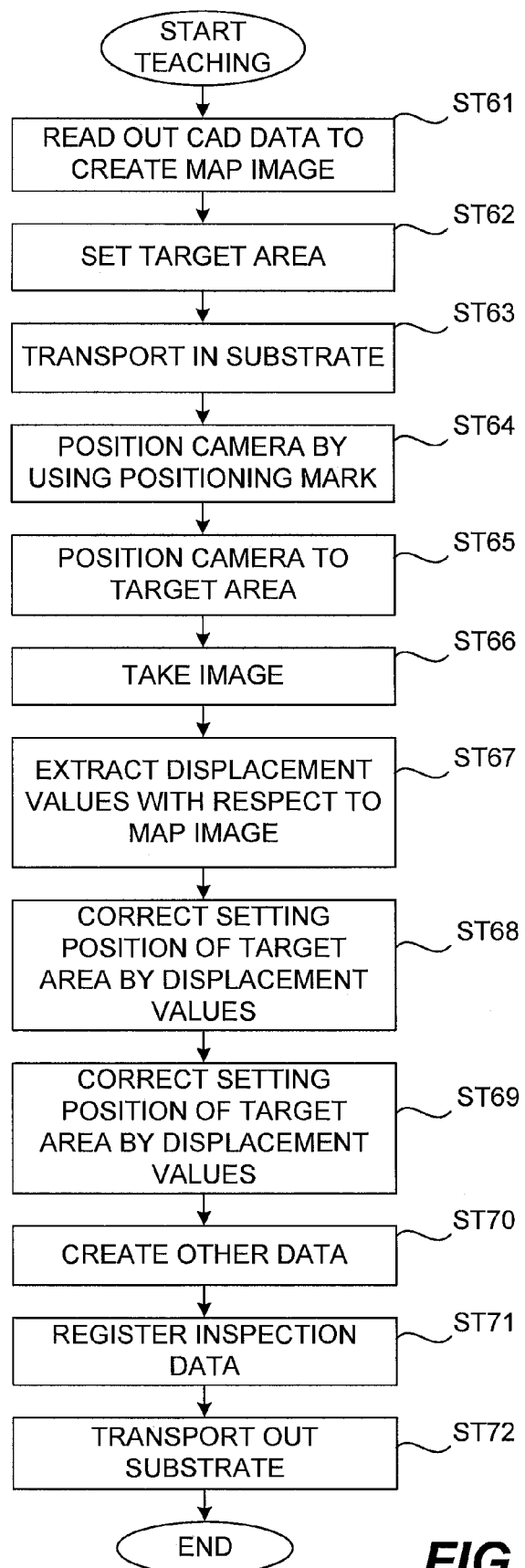
FIG. 17 is a flowchart of the teaching routine for Example 4.

The teaching routine of FIG. 17 starts by reading out the CAD data of the target substrate of inspection, and a map image of inspection areas for the entire substrate is created by using them (Step ST61). Next, a target area 57 is set at a position such that all inspection areas 58 corresponding to the component 56 are included (Step ST62). The setting position of this target area 57 is also expressed by the relative coordinates $(x_T, y_T)$ of the lower right-hand corner of this area 57 with respect to the reference point P as in the case of the whole image 103 in Example 3.

After the standard substrate 1S is transported in (Step ST63), the positional relationship between the standard substrate 1S and the camera 3A is adjusted such that the positioning mark 105 on the image of the standard substrate 1S will be at preliminarily determined coordinates (Step ST64). After this position matching is completed, the X-axis and Y-axis table control parts 6 and 7 are moved based on $x_T$ and $y_T$ to match the position of the camera 3A with the target area 57 set in Step ST62 (Step ST65). An image is taken by the camera 3A to obtain an image that is to become the standard image (Step ST66).

The relative coordinates $(x_T, y_T)$ are used further to extract an image in the target area 57 from the map image of the whole of the substrate and this map image is superposed to the standard image. The map image is scanned for each pixel until the standard image and the map image come to a matching positional relationship and the displacement values Δx and Δy between the standard image and the map image when they are in this matching positional relationship are detected (Step ST67).

Figure 18A:
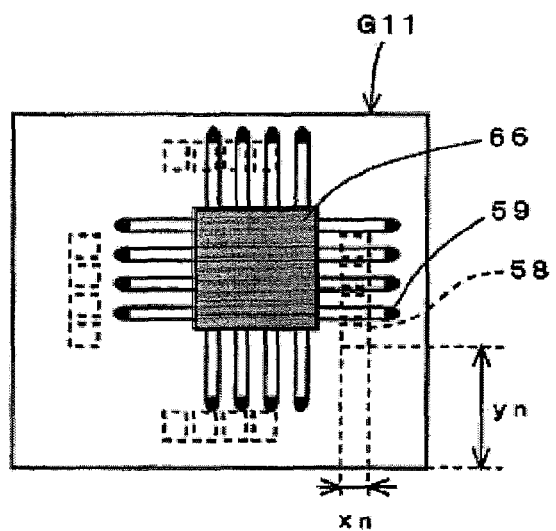
FIGS. 18A and 18B, together referred to as FIG. 18, show the process of detecting displacement values of the standard image for Example 4.
Figure 18B:
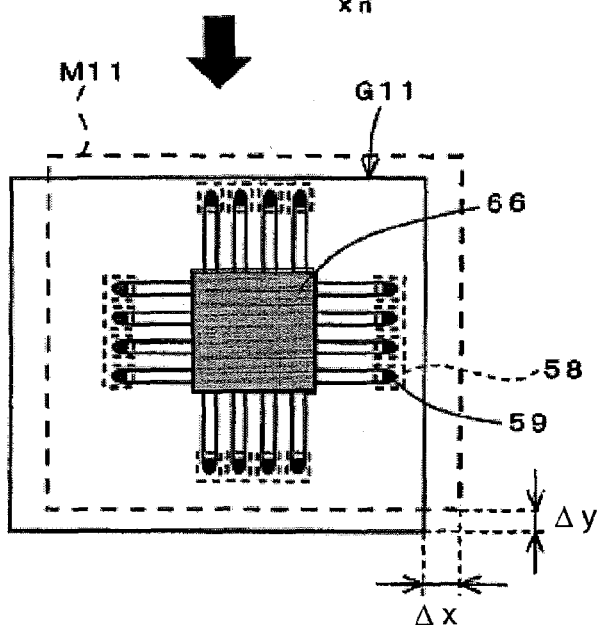

FIG. 18, comprising FIGS. 18A and 18B, is referenced next to explain the process of Step ST67 more in detail. FIG. 18A shows the map image M11 of the target area 57 initially set on the standard image G11. Since the standard image G11 of this example is in a displaced condition with respect to the target area 57, the fillets 59 on the image are also displaced from the corresponding inspection areas 58. FIG. 18B shows the map image M11 after it has been moved to a position such that each fillet 59 is contained in the corresponding inspection area 58. In the condition of FIG. 18B, the standard image G11 and the map image M11 may be considered to be in a matching relationship. The horizontal and perpendicular displacement values of the standard image with respect to the map image are respectively Δx and Δy.

The matching positional relationship between the standard image G11 and the map image M11 is obtained by extracting areas where the red, green and blue colors are distributed on the standard image G11 and distinguishing the extracted areas from the other area by binarization. The map image is also binarized by distinguishing the inspection area 58 from the other area. Thereafter, these two binarized images are moved with respect to each other to obtain a positional relationship where the correlation value becomes the largest. This positional relationship corresponds to the aforementioned matching relationship between the standard image G11 and the map image M11 and their displacement values are $\Delta x$ and $\Delta y$.

With reference again to FIG. 17, after the displacement values $\Delta x$ and $\Delta y$ of the standard image G11 with respect to the map image M11 are obtained in Step ST67, the setting position of the inspection area 58 on the map image is corrected by using these obtained displacement values (Step ST68). Next, the setting position of the target area 57 set in Step ST62 is also corrected similarly by using the displacement values $\Delta x$ and $\Delta y$ (Step ST69).

Thereafter, inspection data for other than the inspection area are created as done in Step ST11 of FIG. 8 (Step ST70). Next, a judgment file is created, including the standard image created in Step ST66, the corrected setting position of the target area, the setting position and the size of the correct inspection area and the other inspection data created in Step ST70, and is registered in the teaching table 13 (Step ST71). After the standard substrate 1S is transported out (Step ST72), this teaching routine is ended. The inspection routine to be carried out after this teaching routine is the same as explained for Example 2 and hence will not be repetitiously explained.

By the teaching process described above, it becomes possible to use the CAD data to set a target area at any position including any specified number of target portions on the substrate without creating a whole image of the standard substrate 1S and to register a standard image and inspection areas necessary for an inspection in this target area.

Although the setting position of the target area 57 is corrected by the displacement values $\Delta x$ and $\Delta y$ according to this teaching process shown by FIG. 17 in addition to the setting position of the inspection area 58, this is not a necessary processing. When it is necessary to correctly obtain the position of a target portion of inspection on the substrate as the relative coordinates as seen from the reference point P, however, it is necessary to correct the setting position of the target area 57. The reason for this is as follows.

The setting data $x_T$ and $y_T$ of the target area 57 are relative coordinates with respect to the reference point P but the setting data $x_n$ and $y_n$ of the inspection area 58 are relative coordinates with respect to the map image G11, or the lower right-hand corner of the target area 57, as shown in FIG. 18A. Since the positional relationship between the substrate and the inspection area 58 is fixed, the relative coordinates of the inspection area relative to the reference point P are always of constant values $(x_T+x_n, y_T+y_n)$. Thus, if the values of $x_n$ and $y_n$ are changed, the values of $x_T$ and $y_T$ must also be changed. For example, if the coordinate $x_n$ of the inspection area is changed to $x_n+\Delta x$, the coordinate $x_T$ of the target area must be changed to $x_T-\Delta x$.

When the setting data $x_T$ and $y_T$ of the target area 57 have been changed, the position of the camera 3a will be matched to the target area after the correction at the time of the inspection but there is also a possibility of machine errors occurring in such a situation. Thus, the inspection area of the target image must be corrected but the setting data of the target area must also be corrected for the same reason if the position of a target portion to be inspected in this inspection area is to be expressed by relative coordinates with respect to the reference point P.

What is claimed is:

1. A method of using image taking means for inspecting a plurality of target portions on a substrate larger than the field of vision of said image taking means and having components mounted thereon by using images taken of said substrate a plural number of times by said image taking means, said method comprising inspection steps for an inspection and preparation steps carried out prior to said inspection steps, said inspection steps and preparation steps are performed using a computer, said preparation steps including:

step A of setting a plurality of target areas according to the field of vision of said image taking means on a standard substrate of a standard substrate considered to be of acceptable quality such that mutually adjacent ones of said target areas have an overlapping portion by a specified amount and taking individual images of said target areas;

step B of creating a whole image of said standard substrate by combining the images obtained in said step A;

step C of specifying the image in each area in said whole image created in said step B as standard image in corresponding target areas at a time of the inspection;

step D of specifying position and size of inspection area suitable to the standard image specified in said step C based on substrate design data corresponding to said standard substrate and setting the specified data as set data of said inspection area; and step E of registering said standard image specified in said step C and the set data of the inspection area specified in said step D for each the target areas at the time of said inspection;

said inspection steps including:

first step of creating an object image for processing by matching the field of vision of said image taking means with one of said target areas;

second step of comparing said object image for processing created in said first step with said standard image registered in said step E and thereby detecting a difference between said object image for processing and said standard image;

third step of correcting set position of the inspection area based on the set data of the inspection area registered in said step E according to the difference detected in said second step and setting said inspection area at the corrected set position on the object image for processing; and fourth step of carrying out image processing for said inspection by using image data in said inspection area set in said third step;

said first step, said second step, said third step and said fourth step being carried out for each of said target areas.

2. The method of claim 1 wherein said step E includes registering said whole image inclusive of said standard image; and wherein said second step includes selecting an area in said whole image most resembling said object image and detecting a displacement of the selected area from the standard image.

3. The method of claim 1 wherein said step C includes specifying each of images obtained by dividing said whole image created in said step B into a size corresponding to said target area as standard image;

wherein said step E includes registering said divided images specified in said step C individually as the standard image; and wherein said second step includes obtaining degrees of similarly at overlapping portions of images while scanning the standard images registered as said object image and detecting the positional displacement value between the overlapping images where the degree of similarity becomes a maximum.

4. The method of claim 1 wherein said step C includes setting a target area at a selected position on said whole image according to said substrate design data and specifying the image within said target area as said standard image;

wherein said step E includes registering said standard image specified in said step C as data indicative of set position of said target area; and wherein said second step includes obtaining degrees of similarly at overlapping portions of images while scanning the standard images registered as said object image and detecting the positional displacement value between the overlapping images where the degree of similarity becomes a maximum.

5. The method of claim 4 wherein said step E includes representing the set position of said inspection area by relative coordinates with respect to a standard point on a standard substrate.

6. An apparatus for carrying out an inspection of a plurality of target portions on a substrate having components mounted thereon by using an image taken of said substrate, said apparatus comprising:

a substrate stage for supporting a target substrate to be inspected with said target portions facing upward;

an image taking means for photographing a substrate supported by said substrate from above;

moving means for changing relative horizontal position between said image taking means and said substrate stage;

a memory that registers a standard image obtained when the field of vision of said image taking means is matched to a specified area on said target substrate, positional relationship between said image taking means and said substrate when said standard image is obtained and positional relationship of inspection area with respect to said standard image;

position adjusting means for controlling motion of said moving means such that the positional relationship between said image taking means and said substrate is adjusted to be the same as the positional relationship registered in said memory;

registering means for carrying out registration in said memory prior to carrying out said inspection;

image creating means for creating a target image to be processed by operating said image taking means after adjustment is made by said position adjusting means;

displacement detecting means for detecting displacement values of the target image with respect to said standard image by matching said target image with said standard image;

area setting means for correcting the positional relationship between said inspection area and said standard image registered in said memory by said displacement values detected by said displacement detecting means and setting an inspection area on said target image based on the corrected positional relationship; and image processing means for carrying out image processing for said inspection by using image data in said inspection area set by said area setting means;

wherein said registering means carries out step A of having a standard substrate considered to be of acceptable quality supported on said substrate stage, setting a plurality of target areas on said standard substrate such that mutually adjacent ones of said target areas have an overlapping portion by a specified amount, and taking individual images of said target areas;

step B of creating a whole image of said standard substrate by combining the images obtained in said step A;

step C of specifying the image in each area in said whole image created in said step B as standard image in corresponding target areas at a time of the inspection;

step D of specifying position and size of inspection area suitable to the standard image specified in said step C based on substrate design data corresponding to said standard substrate and setting the specified data as set data of said inspection area; and step E of registering said standard image specified in said step C and the set data of the inspection area specified in said step D for each the target areas at the time of said inspection.

* * * * *